(12) United States Patent
Kulakofsky et al.

(10) Patent No.: US 7,390,356 B2
(45) Date of Patent: Jun. 24, 2008

(54) COMPOSITIONS FOR HIGH TEMPERATURE LIGHTWEIGHT CEMENTING

(75) Inventors: David S. Kulakofsky, Katy, TX (US); Michael J. Szymanski, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/078,090

(22) Filed: Mar. 11, 2005

(65) Prior Publication Data

US 2006/0201394 A1    Sep. 14, 2006

(51) Int. Cl.
*C04B 16/00* (2006.01)
*C04B 7/32* (2006.01)

(52) U.S. Cl. ............... 106/676; 106/695; 106/696; 106/692

(58) Field of Classification Search ........... 106/676, 106/695, 696, 692
See application file for complete search history.

(56) References Cited

U.S. PATENT DOCUMENTS

| | | |
|---|---|---|
| 2,288,557 A | 6/1942 | Vollmer |
| 3,036,633 A | 5/1962 | Mayhew |
| 3,220,863 A | 11/1965 | Mayhew |
| 3,563,475 A | 2/1971 | Emery et al. |
| 3,669,701 A | 6/1972 | Biederman, Jr. |
| 3,804,058 A | 4/1974 | Messenger |
| 3,902,911 A | 9/1975 | Messenger |
| 4,234,344 A * | 11/1980 | Tinsley et al. ............... 106/672 |
| 4,235,836 A | 11/1980 | Wassell et al. |
| 4,304,298 A | 12/1981 | Sutton |
| 4,340,427 A | 7/1982 | Sutton |
| 4,367,093 A | 1/1983 | Burkhalter et al. |
| 4,370,166 A | 1/1983 | Powers et al. |
| 4,416,547 A | 11/1983 | Mikolajczyk |
| 4,450,010 A | 5/1984 | Burkhalter et al. |
| 4,565,578 A | 1/1986 | Sutton et al. |
| 4,618,376 A | 10/1986 | Saternus et al. |
| 4,761,183 A | 8/1988 | Clarke |
| 4,818,288 A | 4/1989 | Aignesberger et al. |
| 4,886,367 A | 12/1989 | Bragg et al. |
| 5,046,855 A | 9/1991 | Allen et al. |
| 5,086,850 A | 2/1992 | Harris et al. |
| 5,103,908 A | 4/1992 | Allen |
| 5,114,239 A | 5/1992 | Allen |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,156,808 A | 10/1992 | Henry |
| 5,184,680 A | 2/1993 | Totten et al. ............... 166/293 |
| 5,289,877 A | 3/1994 | Naegele et al. |
| 5,314,022 A | 5/1994 | Cowan et al. |
| 5,346,012 A | 9/1994 | Heathman et al. |
| 5,452,954 A | 9/1995 | Handke et al. |
| 5,484,019 A | 1/1996 | Griffith et al. ............... 166/293 |
| 5,522,459 A | 6/1996 | Padgett et al. |
| 5,570,743 A | 11/1996 | Padgett et al. |
| 5,571,318 A | 11/1996 | Griffith et al. |
| 5,588,488 A | 12/1996 | Vijn et al. |
| 5,588,489 A | 12/1996 | Chatterji et al. |
| 5,667,340 A | 9/1997 | Bury |
| 5,672,203 A | 9/1997 | Chatterji et al. ............... 106/808 |
| 5,696,059 A | 12/1997 | Onan et al. |
| 5,711,801 A | 1/1998 | Chatterji et al. |
| 5,779,787 A | 7/1998 | Brothers et al. ............... 106/802 |
| 5,800,756 A * | 9/1998 | Andersen et al. ............... 264/129 |
| 5,806,594 A | 9/1998 | Stiles et al. |
| 5,820,670 A | 10/1998 | Chatterji et al. |
| 5,871,577 A | 2/1999 | Chatterji et al. ............... 106/808 |
| 5,897,699 A | 4/1999 | Chatterji et al. ............... 106/678 |
| 5,900,053 A | 5/1999 | Brothers et al. |
| 5,921,319 A | 7/1999 | Curtice |
| 5,968,255 A | 10/1999 | Mehta et al. |
| 5,972,103 A | 10/1999 | Mehta et al. |
| 6,060,535 A | 5/2000 | Villar et al. |
| 6,063,738 A | 5/2000 | Chatterji et al. ............... 507/269 |
| 6,109,350 A | 8/2000 | Nguyen et al. |
| 6,143,069 A | 11/2000 | Brothers et al. |
| 6,145,591 A | 11/2000 | Boncan et al. |
| 6,152,227 A | 11/2000 | Lawson et al. |
| 6,153,562 A | 11/2000 | Villar et al. |
| 6,156,808 A | 12/2000 | Chatterji et al. ............... 516/116 |

(Continued)

FOREIGN PATENT DOCUMENTS

| | | |
|---|---|---|
| EP | 0 814 067 A1 | 12/1997 |
| EP | 0 621 247 B1 | 7/1999 |
| EP | 1 236 701 A1 | 9/2002 |
| EP | 1 348 831 A1 | 10/2003 |
| EP | 1 394 137 A2 | 3/2004 |

(Continued)

OTHER PUBLICATIONS

Sabins, "Ultra-Lightweight Cement Slurries Improve Cement Performance", GasTips, Fall 2002.*
Halliburton brochure entitiled "D-AIR 3000 and D-AIR 3000L" dated 1999.
Halliburton brochure entitled "Fe-2 Iron Sequestering Agent" dated 1998.

(Continued)

*Primary Examiner*—Elizabeth D Wood
(74) *Attorney, Agent, or Firm*—Craig W. Roddy; Haynes & Boone, LLP.

(57) ABSTRACT

Compositions for performing cementing operations in a subterranean zone under high temperature conditions have a density of less than about 10.5 pounds per gallon, and include calcium aluminate, water, and a lightweight additive having a specific gravity of less than about 0.70.

11 Claims, No Drawings

U.S. PATENT DOCUMENTS

| | | | |
|---|---|---|---|
| 6,173,778 B1 | 1/2001 | Rae et al. | |
| 6,196,316 B1 | 3/2001 | Bosma et al. | |
| 6,230,804 B1 | 5/2001 | Mueller et al. | |
| 6,244,343 B1 | 6/2001 | Brothers et al. | |
| 6,273,191 B1 | 8/2001 | Reddy et al. | |
| 6,297,202 B1 | 10/2001 | Chatterji et al. | 507/261 |
| 6,312,515 B1 | 11/2001 | Barlet-Gouedard et al. | |
| 6,332,921 B1 | 12/2001 | Brothers et al. | |
| 6,336,505 B1 | 1/2002 | Reddy et al. | |
| 6,367,549 B1 | 4/2002 | Chatterji et al. | |
| 6,401,814 B1 | 6/2002 | Owens et al. | |
| 6,454,004 B2 | 9/2002 | Reddy et al. | |
| 6,457,524 B1 | 10/2002 | Roddy | 166/293 |
| 6,488,763 B2 | 12/2002 | Brothers et al. | |
| 6,497,283 B1 | 12/2002 | Eoff et al. | |
| 6,508,305 B1 | 1/2003 | Brannon et al. | 166/293 |
| 6,511,537 B1 | 1/2003 | Barlet-Gouedard et al. | |
| 6,516,883 B1 | 2/2003 | Chatterji et al. | 166/293 |
| 6,562,122 B2 | 5/2003 | Dao et al. | |
| 6,601,647 B2 | 8/2003 | Brothers et al. | |
| 6,626,243 B1 | 9/2003 | Boncan | |
| 6,626,991 B1 | 9/2003 | Drochon et al. | |
| 6,630,021 B2 | 10/2003 | Reddy et al. | |
| 6,631,766 B2 | 10/2003 | Brothers et al. | |
| 6,644,405 B2 | 11/2003 | Vijn et al. | |
| 6,645,288 B1 | 11/2003 | Dargaud et al. | 106/696 |
| 6,648,961 B2 | 11/2003 | Brothers et al. | |
| 6,656,265 B1 | 12/2003 | Garnier et al. | |
| 6,660,078 B2 | 12/2003 | Brothers et al. | |
| 6,689,208 B1 | 2/2004 | Brothers | |
| 6,729,405 B2 | 5/2004 | DiLullo et al. | 166/292 |
| 6,739,806 B1 | 5/2004 | Szymanski et al. | 405/267 |
| 6,742,592 B1 | 6/2004 | Le Roy-Delage et al. | |
| 6,767,867 B2 | 7/2004 | Chatterji et al. | |
| 6,776,237 B2 | 8/2004 | Dao et al. | |
| 6,793,730 B2 | 9/2004 | Reddy et al. | 106/677 |
| 6,796,378 B2 | 9/2004 | Reddy et al. | |
| 6,814,798 B2 | 11/2004 | Vijn et al. | |
| 6,832,652 B1 | 12/2004 | Dillenbeck et al. | 166/293 |
| 6,874,578 B1 | 4/2005 | Garnier et al. | |
| 6,969,423 B2* | 11/2005 | Li et al. | 106/672 |
| 7,073,584 B2 | 7/2006 | Reddy et al. | |
| 2002/0100394 A1* | 8/2002 | Lu | 106/696 |
| 2003/0116064 A1 | 6/2003 | Danican et al. | |
| 2003/0168215 A1 | 9/2003 | Drochon et al. | |
| 2004/0016371 A1 | 1/2004 | Chatterji et al. | 106/716 |
| 2004/0112600 A1 | 6/2004 | Luke et al. | 166/295 |
| 2004/0144537 A1 | 7/2004 | Reddy et al. | |
| 2004/0168803 A1 | 9/2004 | Reddy et al. | |
| 2004/0171499 A1 | 9/2004 | Ravi et al. | 507/200 |
| 2004/0206501 A1 | 10/2004 | Brothers et al. | 166/292 |
| 2004/0211562 A1 | 10/2004 | Brothers et al. | 166/281 |
| 2004/0211564 A1* | 10/2004 | Brothers et al. | 166/293 |
| 2004/0226717 A1 | 11/2004 | Reddy et al. | 166/295 |
| 2004/0244650 A1 | 12/2004 | Brothers et al. | 106/681 |
| 2004/0262000 A1 | 12/2004 | Morgan et al. | 166/293 |
| 2004/0262001 A1 | 12/2004 | Caveny et al. | 166/293 |
| 2005/0011412 A1 | 1/2005 | Vijn et al. | |
| 2005/0034864 A1 | 2/2005 | Caveny et al. | 166/293 |
| 2005/0034866 A1 | 2/2005 | Brothers et al. | 166/305.1 |
| 2005/0034867 A1 | 2/2005 | Griffith et al. | 166/305.1 |
| 2005/0056191 A1 | 3/2005 | Brothers et al. | 106/811 |
| 2005/0061505 A1 | 3/2005 | Caveny et al. | 166/285 |
| 2005/0166803 A1 | 8/2005 | Dillenbeck et al. | |
| 2005/0241538 A1 | 11/2005 | Vargo, Jr. et al. | |
| 2005/0241545 A1 | 11/2005 | Vargo, Jr. et al. | |

FOREIGN PATENT DOCUMENTS

| | | |
|---|---|---|
| EP | 0 748 782 B1 | 6/2004 |
| EP | 1 159 234 B1 | 2/2005 |
| EP | 1 193 230 B1 | 4/2005 |
| GB | 2 387 593 A | 10/2003 |
| WO | WO 97/28097 | 8/1997 |
| WO | WO 00/20350 | 4/2000 |
| WO | WO 00/29351 | 5/2000 |
| WO | WO 00/34199 | 6/2000 |
| WO | WO 01/09056 A1 | 2/2001 |
| WO | WO 01/87796 A1 | 11/2001 |
| WO | WO 01/87797 A1 | 11/2001 |
| WO | WO 2005/047212 A1 | 5/2005 |
| WO | WO 2005/061846 A1 | 7/2005 |

OTHER PUBLICATIONS

Halliburton brochure entitled "Latex 2000 Cement Additive" dated 1998.

Halliburton brochure entitled "Micro Fly Ash Cement Component" dated 1999.

Halliburton brochure entitled Pozmix® A Cement Additive dated 1999.

Halliburton brochure entitled "Stabilizer 434B Latex Stabilizer" dated 1999.

3M paper entitled "Specialty Materials for the Oil & Gas Industry" dated 2004.

Halliburton Energy Services, Inc.; *ThermaLock Cement For Corrosive $CO_2$ Environments*, Jun. 1999.

Online Product Catalog from 3M™; *Glass Bubbles HGS2000*, downloaded Nov. 15, 2004.

CADE/CAODC Drilling Conference; *Use of Hollow Glass Bubbles as a Density Reducing Agent for Drilling*; Oct. 23 and 24, 2001; Calgary, Alberta Canada.

Office action dated Aug. 22, 2006 from U.S. Appl. No. 11/078,956.

Halliburton brochure entitled "MicroBond HT Cement Additive" dated 1999.

Halliburton brochure entitled "MicroBond M Cement Additive" dated 1999.

Halliburton brochure entitled "OptiCem RT™ Cement Job Design and Simulation System" dated 2005.

Halliburton brochure entitled "Spherelite Cement Additive" dated 1999.

Halliburton brochure entitled "Super CBL Additive" dated 2005.

Halliburton brochure entitled "MicroBond Expanding Additive for Cement" dated 1999.

Halliburton brochure entitled "Integrated Cement Job Simulator" dated 1999.

Halliburton brochure entitled "CFR-3™ Cement Friction Reducer" dated 2005.

3M brochure entitled "Density Reducing Additives for Drilling Cements" dated 2005.

Vassilev, S.V. et al., "Phase-Mineral and chemical composition of coal fly ashes as a basis for their multicomponent utilization" dated 2002.

Heathman, J.F. et al., "Case Histories Regarding The Application of Microfine Cements" IADC/SPE 23926 dated 1992.

Harms, W.M. et al., "Microspheres cut density of cement slurry" Oil & Gas Journal, 99. 59-99, dated 1981.

Harms, W.M. et al., "Ultralow-Density Cementing Operations" dated 1983.

Clarke, W.J. et al., "Ultrafine Cement For Oilwell Cementing" SPE 25868 dated 1993.

Murali, B.N. et al., "Field Performance of Ultralightweight Cement Slurry Compositions Used In the UADE" SPE 13692, dated 1987.

Wu, C. et al., "High-Strength Microsphere Additive Improves Cement Performance in Gulf of Bohai" SPE 14094, dated 1986.

Harris, K.L. et al., "New Lightweight Technology for the Primary Cementing of Oilfield Casing in Cold Environments" SPE 22065, dated 1991.

Revil, P., et al., "A New Approach to Designing High-Performance Lightweight Cement Slurries for Improved Zonal Isolation in Challenging Situations" IADS/SPE 47830, dated 1998.

Kimura, K. et al., "Custom-Blending Foamed Cement for Multiple Challenges" SPE/IADC 57585, dated 1999.

Harris, K.L. et al., Successful Remedial Operations Using Ultrafine Cement SPE 24294, dated 1992.

Ripely, H.E. et al., "Ultra-Low Density Cementing Compositions" dated 1980.

Harness, P.E. et al., "New Technique Provides Better Low-Density-Cement Evaluation" SPE 24050, dated 1992.

Moulin, E., et al., "Using Concrete Technology to Improve the Performance of Lightweight Cements" SPE/IADC 39276 dated 1997.

Halliburton brochure entitled "Continuous Metering System (CMS) Liquid-Additive Metering System" dated 2000.

3M brochure entitled 3M™ Glass Bubbles HGS2000 dated 2004.

Foreign communication from a related counterpart application dated Jul. 5, 2006.

Kulakofsky, D.S. et al., "Methods for High Temperature Lightweight Cementing" filed Mar. 11, 2005 as U.S. Appl. No. 11/078,956.

Vargo, Jr., R.F. et al., "Methods of Extending The Shelf Life of and Revitalizing Lightweight Beads For Use In Cement Compositions" filed Aug. 20, 2004 as U.S. Appl. No. 10/922,620.

Vargo, Jr. R.F. et al., "Methods of Making Cement Compositions Using Liquid Additives Containing Lightweight Beads" filed Apr. 28, 2004 as U.S. Appl. No. 10/833,616.

Kulakofsky, D.S. et al., "Methods of Cementing With Lightweight Cement Compositions" filed Feb. 24, 2005 as U.S. Appl. No. 11/057,677.

Office Action issued Feb. 22, 2007, by the United States Patent and Trademark Office in connection with U.S. Appl. No. 11/057,677.

Office Action issued Jun. 6, 2007, by the United States Patent and Trademark Office in connection with U.S. Appl. No. 11/078,956.

International Search Report and Written Opinion issued Nov. 3, 2005, in connection with International Application No. PCT/GB2005/003183.

International Search Report and Written Opinion issued Sep. 9, 2005, in connection with International Application No. PCT/GB2005/001415.

International Search Report and Written Opinion issued Jun. 30, 2006, in connection with International Application No. PCT/GB2006/000394.

Halliburton brochure entitled "Stabilizer 434B Latex Stabilizer" dated 2005.

Halliburton brochure entitled "CFR-3 Cement Friction Reducer Dispersant" dated 1998.

Halliburton brochure entitled "OptiCem RT™ Cement Job Design and Simulation System" dated 2000.

Halliburton brochure entitled "Super CBL Additive Cement Additive" dated 1999.

3M Specialty Materials brochure entitled "Scotchlite Glass bubbles HGS Series" dated 2002.

Smith, R.C. et al. "A New Ultra-Lightweight Cement with Super Strength" Journal of Petroleum Technology, pp. 1438-1444.

Improved Performance of Ultra-Lightweight Cement Compositions, DOE Project, DE-FC26-00NT40-919, Conducted by Cementing Solutions Inc., first published Oct. 4, 2003.

Office Action issued Sep. 6, 2007, by the United States Patent and Trademark Office in connection with U.S. Appl. No. 10/922,620.

Office Action issued Nov. 14, 2007, by the United States Patent and Trademark Office in connection with U.S. Appl. No. 10/057,677.

Office Action issued Nov. 14, 2007, by the United States Patent and Trademark Office in connection with U.S. Appl. No. 11/078,956.

Office Action from U.S. Appl. No. 10/833,616, filed Oct. 9, 2007.

Office Action from U.S. Appl. No. 11/057,677, filed Nov. 14, 2007.

Office Action from U.S. Appl. No. 10/922,620, filed Dec. 12, 2007.

Wong, Arnold, "Use of Hollow Glass Bubbles as Density Reducing Agents for Drilling", dated Oct. 2001, CADA/CAODC Drilling Conference.

Office Action from U.S. Appl. No. 10/922,620, filed Sep. 6, 2007.

* cited by examiner

COMPOSITIONS FOR HIGH TEMPERATURE LIGHTWEIGHT CEMENTING

BACKGROUND

The present invention relates generally to compositions for performing cementing operations in a well bore. More particularly, the present invention relates to compositions that are suitable for operations requiring a lightweight cement and that are performed in high temperature well conditions.

High temperature subterranean wells, for example, geothermal wells, often contain carbon dioxide. Because of the high static well bore temperatures involved, coupled with the presence of fresh or brine waters containing carbon dioxide, or hydrocarbons containing carbon dioxide, conventional hydraulic well cements rapidly deteriorate due to alkali carbonation, especially sodium carbonate induced carbonation. Further, severe corrosion of steel pipe takes place thereby resulting in the total disruption of the conventional cement supported well structure. In geothermal wells, which typically involve very high temperatures, pressures and carbon dioxide concentrations, conventional well cement failures have occurred in less than five years causing the collapse of the well casing.

It has heretofore been discovered that a cement material known as calcium phosphate cement formed by an acid-base reaction between calcium aluminate and a phosphate-containing solution has high strength, low permeability and excellent carbon dioxide resistance when cured in hydrothermal environments. However, calcium phosphate cement has a relatively high density, e.g., a density in the range of from about 14 to about 17 pounds per gallon, which is too high for some geothermal applications. That is, in geothermal wells, the hydrostatic pressure exerted by normal density calcium phosphate cement can exceed the fracture gradients of subterranean zones penetrated by the well bore. Consequently, fractures are created in the formation and cement enters into such fractures and is lost.

Thus, there is a need for lightweight well cementing compositions useful in performing cementing operations under high temperature conditions.

DESCRIPTION

Methods described herein provide for cementing a subterranean zone in high temperature conditions by forming a cementing composition having a density of less than about 10.5 pounds per gallon and comprising calcium aluminate, water, and a lightweight additive having a specific gravity of less than about 0.70, pumping the cementing composition into the subterranean zone by way of the well bore and allowing the cementing composition to set therein.

Other exemplary methods include forming a cementing composition having a density of less than about 10.0, less than about 9.5, less than about 9.0, less than about 8.5, less than about 8.0, or less than about 7.5 pounds per gallon, and which comprise calcium aluminate, water, and a lightweight additive having a specific gravity of less than about 0.60, less than about 0.50, less than about 0.40 or less than about 0.30. For example, cementing compositions having a density of about 8.5 pounds per gallon can be prepared with a lightweight additive having a specific gravity of about 0.32. In other examples, cementing compositions having a density greater than about 8.5 pounds per gallon could be prepared with a lightweight additive having a specific gravity of greater than about 0.32. Generally, the greater the specific gravity of the lightweight additive, the higher the lower limit of density that can be achieved in cementing compositions prepared according to the methods described herein, while maintaining the compressive strength and competency of the composition.

According to other methods described herein, a cementing composition having a density of less than about 10.5 pounds per gallon can be prepared by identifying lightweight additives that are suitable for use at the bottom circulating pressure of a given well (i.e., that will not be crushed at the bottom circulating pressure to the extent that they are no longer functional) and selecting the lightweight additive having the lowest specific gravity. By selecting the lightweight additive having the lowest specific gravity, less lightweight additive is needed to reduce the density of the cementing composition, thereby providing for a higher cement ratio in the cementing composition. The higher cement ratios of cementing compositions prepared according to methods described herein result in lightweight cementing compositions that maintain their compressive strength and competency even under conditions (e.g., carbon dioxide or high temperature) that would cause conventional lightweight cements to fail. Failure conditions, such as the presence of carbon dioxide or high temperatures, can be inherent in the well or can be caused by operations conducted in the well, such as steam injection. High temperatures contemplated herein include temperatures in the range of about 200° F. to about 800° F. In certain examples, a high temperature in the range of about 500° F. to about 600° F., or about 550° F., or about 580° F. could be caused by a steam injection operation. Cementing operations can be successfully performed at any of these temperatures using cementing compositions as described herein.

In certain examples, the lightweight additive comprises a synthetic additive. According to some such examples, the lightweight additive comprises hollow glass bubbles having a specific gravity of less than about 0.60, less than about 0.50, about 0.40 or less than about 0.30. The amount of lightweight additive in cementing compositions according to the methods described herein can be any amount that enables a target density to be achieved, while maintaining compressive strength and competency of the cementing composition. In certain examples, the lightweight additive is present in the cementing composition in an amount of from about 5% to about 200% by weight of the cement in the cementing composition. In other examples, the lightweight additive is present in the cementing composition in an amount of from about 15% to about 150%, about 15% to about 100%, or about 15% to about 50% by weight of the cement in the cementing composition. In still other examples, the lightweight additive is present in the cementing composition in an amount of from about 5% to about 120%, about 10% to about 50%, or about 10% to about 30% by weight of the cement in the cementing composition. In still other examples, the amount of lightweight additive is about 13% of the total weight of the cementing composition. In still other examples, the amount of lightweight additive is about 27% by weight of the cement in the cementing composition.

The cement (which is sometimes referred to herein as the "cement component") of the cementing compositions comprises calcium aluminate. Suitable calcium aluminates include those commercially available from the Lehigh Portland Cement Company of Allentown, Pa. and LaFarge Calcium Aluminates of Cheasapeake, Va., under the trade designations "REFCON™" and "SECAR-60™," respectively.

In certain examples, the cement component of the compositions used in methods described herein can be 100% calcium aluminate. According to other examples, cementing in a high temperature subterranean zone includes forming a cementing composition as described above, and further including one or more of sodium polyphosphate, fly ash or vitrified shale as a part of the cement component of the composition.

In examples where the cement includes calcium aluminate and one or more of sodium polyphosphate, fly ash or vitrified shale, the calcium aluminate comprises from about 15 to about 75 weight percent of the cement. In certain examples where the cement includes calcium aluminate and one or more of sodium polyphosphate, fly ash or vitrified shale, the calcium aluminate comprises from about 15 to about 50, or about 30 to about 60 weight percent of the cement.

If used, the sodium polyphosphate can be any sodium polyphosphate, including but not limited to sodium metaphosphate, sodium triphosphate, sodium hexametaphosphate, vitreous sodium phosphates, and mixtures of the foregoing. A suitable sodium polyphosphate for use in accordance with the methods described herein is sodium hexametaphosphate that is commercially available from a number of sources, such as Calgon Corporation of Pittsburgh, Pa. The sodium polyphosphate combines with the calcium aluminate to form calcium phosphate in the form of hydroxyapatite. If used, the sodium polyphosphate comprises from about 1 to about 20 weight percent of the cement. In certain examples where sodium polyphosphate is used, sodium polyphosphate comprises from about 5 to about 20, about 2 to about 10, or about 3 to about 7 weight percent of the cement.

Fly ash is the finely divided residue that results from the combustion of ground or powdered coal and is carried by the flue gases generated. If used, a particular fly ash that is suitable for use in methods described herein is a fine particle size ASTM class F fly ash having a Blaine fineness of about 10,585 $cm^2/g$, which is commercially available from LaFarge Corporation of Michigan under the trade designation "POZ-MIX™". Another fly ash that is suitable is an ASTM class F fly ash which is commercially available from Halliburton Energy Services of Dallas, Tex. under the trade designation "POZMIX™ A". If used, the fly ash comprises from about 5 to about 75 weight percent of the cement. In some examples, about 25 to about 45, about 25 to about 55, or about 10 to about 60 weight percent of the cement.

The major crystalline phase of ASTM class F fly ash is mullite ($3Al_2O_3 2SiO_2$). It reacts with calcium aluminate to form calcium alumino silicate ($CaO Al_2O_3 2SiO_2$). Also, iron and quartz in the fly ash react with the calcium aluminate to form andradite ($Ca_3Fe_2SiO_4)_3$. The reactions with fly ash increase the compressive strength of the set cement as compared to set calcium aluminate cement alone.

Vitrified shale can be used instead of or in addition to fly ash. Vitrified shale is commercially available from a number of sources, such as TXI Cement, Midlothian, Tex.

The water utilized can be from any source provided it does not contain an excess of compounds that adversely affect other compounds in the cementing composition. For example, the water can be fresh water, saltwater, brine or sea water. Generally, the water is present in the cementing composition in an amount sufficient to form a pumpable slurry. In certain examples, a sufficient amount of water is in the range of from about 10% to about 120% by weight of the cement component (that is, the calcium aluminate, or the total weight of the calcium aluminate and optional sodium polyphosphate, fly ash and vitrified shale). In some examples, the amount of water present in the cementing compositions is in the range of from about 10% to about 116%, about 10% to about 100%, about 10% to about 80%, about 10% to about 60%, or about 10% to about 40% by weight of the cement component. In other examples, the amount of water present in the cementing compositions is in the range of from about 20% to about 75%, or about 20% to about 55% by weight of the cement component. In still other examples, the amount of water present in the cementing compositions is about 52%, about 56%, or about 60% by weight of the cement component.

In certain examples, the cementing compositions used in methods described herein include a retarder. If used, the retarder functions to lengthen the time in which the cementing composition starts to thicken and set so that the composition can be pumped into the well bore and into the zone to be cemented before such thickening takes place. Cementing compositions used in conditions having temperatures greater than about 125° F. will include a retarder. Suitable retarders for use with cementing methods and compositions described herein include gluconic acid, citric acid, and tartaric acid, each of which is commercially available from a number of sources, for example, Halliburton Energy Services. If used in cementing compositions described herein, the retarder is included in the cementing composition in an amount in the range of from about 0.1% to about 10% by weight of the cement in the cementing composition. In some examples, the retarder is included in the cementing composition in an amount in the range of from about 0.1% to about 6%, 0.1% to about 3%, or 0.5% to about 4% by weight of the cement in the cementing composition. In certain examples, the retarder is selected from the group of gluconic acid, citric acid, and tartaric acid, and is included in the cementing compositions in an amount of about 1%, about 2%, or about 3% by weight of the cement. In certain examples, the amount of retarder is about 0.5% of the total weight of the cementing composition.

In certain examples, the cementing compositions used in methods described herein include a latex. The latex functions as a fluid loss agent. Suitable latexes for use in accordance with cementing methods and compositions described herein include ethylene/vinylacetate, styrene butadiene, butadiene acrylonitrile and acetate ethylene. If used, latex is included in the cementing composition in an amount in the range of from about 2% to about 70% by weight of the cement. In certain examples, latex is included in the cementing composition in an amount in the range of from about 5% to about 40%, about 5% to about 30%, or about 10% to about 30% by weight of the cement. In certain examples, the latex is included in the cementing compositions in an amount of about 20% by weight of the cement. In other examples, the latex is included in the cementing compositions in an amount of about 10% of the total weight of the cementing composition.

If a latex is included in the cementing composition, then a defoamer is also included. Suitable defoamers for use in accordance with the methods and compositions described herein include a composition comprising polypropylene glycol, particulate hydrophobic silica and a light oil diluent, and silicone oils. If used, defoamer is included in the cementing composition in an amount in the range of from about 0.1% to about 2.0% by weight of the cement. In certain examples, the defoamer is included in the cementing composition in an amount in the range of from about 0.1% to about 1.0% by weight of the cement. In certain other examples, the defoamer is included in the cementing compositions in an amount of about 0.50% by weight of the cement. In still other examples, the defoamer is included in the cementing compositions in an amount of about 0.25% of the total weight of the cementing composition.

If a latex is included in the cementing composition, then a surfactant is also included to stabilize the latex. Suitable surfactants for use in accordance with cementing methods and compositions described herein include a sulfate salt of ethoxylated nonylphenol solution and an ethoxylated sulfonated alcohol. If used, surfactant is included in the cementing composition in an amount in the range of from about 1.0% to about 5.0% by weight of the cement component. In certain examples, surfactant is included in the cementing compositions in an amount of about 3.0% by weight of the cement component. In other examples, surfactant is included in the cementing compositions in an amount of about 1.5% of the total weight of the cementing composition. In still other examples, the amount of surfactant is expressed by weight of the amount of latex in the cementing composition. According to some examples, surfactant is included in the cementing compositions in an amount of about 5% to about 25% by weight of the latex, or from about 10% to about 15% by weight of the latex.

Although certain defoamers, surfactants and latexes are described as suitable for use in the methods and compositions disclosed herein, these descriptions are exemplary only. The methods and compositions disclosed herein can be practiced with any latex that has been stabilized and defoamed. Thus, a wide range of options are available for use in methods and compositions as described herein, and one of ordinary skill in the art can select a latex, and a defoamer and stabilizer to defoam and stabilize the latex, through routine experimentation.

The composition may optionally include other additives, such as inert ground rubber particles or fluid loss agents. An exemplary source of such ground rubber particles include those produced from tires that are commercially available from Four D Corporation of Duncan, Okla. If ground rubber particles are used, they can be present in an amount in the range of from about 10% to about 40% by weight of the compositions to improve the resiliency of the compositions. Exemplary fluid loss agents include latex, as described above, and cellulose derivatives, such as a cellulose derivative commercially available from Halliburton Energy Services under the tradename FDP-662.

According to alternatives of the methods described herein, the cementing compositions can be foamed. A cementing composition that includes calcium aluminate, water, and a lightweight additive having a specific gravity of less than about 0.70, can be foamed by including a foaming agent and a foam stabilizer in the composition, and then foaming the composition with a gas, such as air or nitrogen.

A particularly suitable and preferred foaming agent is an alpha-olefinic sulfonate having the formula

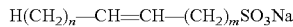
$H(CH_2)_n$—CH=CH—$(CH_2)_m SO_3 Na$ wherein n and m are individually integers in the range of from about 6 to about 16. The most preferred foaming agent of this type is an alpha-olefinic sulfonate having the above formula wherein n and m are each 16, i.e., a sulfonic acid $C_{16-16}$ alkane sodium salt. If included in the cementing composition, the foaming agent can generally be included in an amount in the range of from about 0.2% to about 5% by weight of the water in the cementing composition. In certain examples, foaming agent is included in the cementing composition in an amount of from about 0.2% to about 1.5%, 0.2% to about 3%, or about 1% to about 2%, by weight of the water in the cementing composition.

If a foaming agent is included in the cementing composition, then a foam stabilizer is also included to enhance the stability of the composition after it is foamed. A particularly suitable and preferred stabilizing agent is an amidopropylbetaine having the formula

R—$CONHCH_2CH_2N^+(CH_3)_2CH_2CO_2^-$ wherein R is a radical selected from the group of decyl, cetyl, oleyl, lauryl and cocoyl. The most preferred foam stabilizer of this type is cocoylamidopropylbetaine. If included in the cementing composition, the foam stabilizer can generally be included in an amount in the range of from about 0.2% to about 5% by weight of the water in the cementing composition. In certain examples, foam stabilizer is included in the cementing composition in an amount of from about 0.2% to about 1.5%, 0.2% to about 3%, about 0.5% to about 1.5%, or about 1% to about 2% by weight of the water in the cementing composition.

If the cementing composition is foamed, then the gas utilized to foam the composition can be air or nitrogen, with nitrogen being the most preferred. The amount of gas present in the cementing composition is that amount which is sufficient to form a foamed cementing composition having a density of less than about 10.5 pounds per gallon. In certain examples, the amount of gas in the cementing composition is from about 20 to about 30 volume percent.

In an exemplary method where a cementing composition as described herein is foamed, a cementing composition comprising calcium aluminate, water, and a lightweight additive having a specific gravity of less than about 0.70, is pumped into the well bore, and the foaming agent and foam stabilizer, followed by the gas, are injected into the cementing composition on the fly. As the composition and gas flow through the well bore to the location where the resulting foamed cementing composition is to be placed, the cementing composition is foamed and stabilized.

Foamed cementing compositions as described herein can further include other additives, such as retarders and fluid loss control agents as described herein, provided that such other additives do not adversely affect the properties desired for the foamed cementing compositions.

To further illustrate the methods and cementing compositions described herein, the following examples are given.

EXAMPLE 1

A cement comprising calcium aluminate, sodium polyphosphate and fly ash in the weight percents reported in Table 1 was obtained from Halliburton Energy Services.

TABLE 1

| Component | Amount (wt %) |
|---|---|
| Calcium aluminate | 47.5 |
| Fly ash | 47.5 |
| Sodium polyphosphate | 5.0 |

The cement described in Table 1 was obtained as a dry-blend product offered under the tradename Thermalock™. The calcium aluminate was a calcium aluminate commercially available from LaFarge Calcium Aluminates under the tradename SECAR 60™. The sodium polyphosphate was sodium hexametaphosphate, commercially available from Calgon Corporation as a commodity and without a tradename. The fly ash was Class F fly ash, commercially available from Mountaineer as a commodity and without a tradename.

The cement of this Example 1 was combined with a lightweight additive and a mixing fluid as described in Example 2.

EXAMPLE 2

A mixing fluid comprising water, retarder, defoamer, surfactant and latex was prepared by combining these components in the amounts as described in Table 2, which are reported as a weight in grams, a weight percent (bwc) that is based on the total weight of the cement component (the calcium aluminate, sodium polyphosphate and fly ash in Example 1), and a weight percent of the total weight of the cementing composition.

Water in the amount reported in Table 2 was added to a Waring blender, and the blender was activated to operate at between 4000-5000 rpm. The blender speed was maintained at between 4000-5000 rpm during the addition of each component listed in Table 2. The retarder was added and allowed to dissolve. The retarder was a citric acid retarder commercially available under the tradename "FE-2" from Halliburton Energy Services.

Following dissolution of the retarder, the defoamer was added to the blender, followed by addition of the surfactant.

The defoamer was a defoaming agent comprising polypropylene glycol, particulate hydrophobic silica and a C15-C18 hydrocarbon diluent, which is commercially available from Halliburton Energy Services under the tradename "D-Air 3000L". The surfactant was a sulfate salt of ethoxylated nonylphenol solution (32% active) that is commercially available from Halliburton Energy Services under the tradename "Stabilizer 434B". Following addition of the defoamer and surfactant, the latex was added without delay.

The latex, which was a latex emulsion comprising styrene butadiene, which is commercially available from Halliburton Energy Services under the tradename "Latex 2000", was then added to the mixture, which was then allowed to stir for about 1 minute.

After about 1 minute of stirring, the lightweight additive was added to the mixture over about a 15 second period. The lightweight additive comprised synthetic glass bubbles having a specific gravity of about 0.32, which are commercially available under the tradename HGS2000 from 3M, Minnesota.

Following addition of the lightweight additive, a cement component prepared as described in Example 1 was added to blender over approximately 1 minute. Mixing continued for about 2 minutes after addition of the cement was complete.

TABLE 2

| Component | Specific Gravity (SG) | Amount (% bwc) | Amount (grams) | Amount (wt %) |
|---|---|---|---|---|
| Water | 0.998 | 57.0 | 228.0 | 27.3 |
| Retarder | 1.54 | 0.90 | 3.6 | 0.43 |
| Defoamer | 1.2 | 0.50 | 2.0 | 0.24 |
| Surfactant | 1.06 | 3.0 | 12.0 | 1.44 |
| Latex | 0.996 | 20.0 | 80.0 | 9.59 |
| Lightweight Additive | 0.32 | 27.1 | 108.4 | 13.0 |
| Cement | 2.5 | 100.0 | 400.0 | 48.0 |
| | | | 834.0 g total | |

The density of the cementing composition prepared according to this Example 2 was about 8.5 pounds per gallon.

Rheological data regarding the cementing composition prepared according to this Example 2 is reported below in Table 3.

obtain the dial readings was that set forth in Section 12 of the API Specification RP 10B, 22nd Edition, 1997, of the American Petroleum Institute, which is a text known and available to those of ordinary skill in the art. The dial readings indicate that the cementing composition has a viscosity suitable for introduction into a well bore.

The 10 second and 10 minute readings indicate the gel strength of the cementing composition. The readings were determined using a Fann Model 35 viscometer at 3 RPM. The procedure used to obtain the dial readings was that set forth in Section 12 of the API Specification RP 10B, 22nd Edition, 1997, of the American Petroleum Institute, which is a text known and available to those of ordinary skill in the art. The gel strength readings indicate that the cementing composition attains gel strengths suitable for introduction into a well bore.

The plastic viscosity (PV) and yield point (YP) of the cementing composition were calculated from the determined Theological data according to calculations described in Section 12 of the API Specification RP 10B, 22nd Edition, 1997, of the American Petroleum Institute, which is a text known and available to those of ordinary skill in the art. The plastic viscosity (reported in centipoises, "cp") and yield point values indicate that the cementing composition has properties suitable for introduction into a well bore.

The free water data was determined by pouring a portion of the cementing composition into a cylinder and allowing the cylinder to stand, as described in Section 15 of the API Specification RP 10B, 22nd Edition, 1997, of the American Petroleum Institute, which is a text known and available to those of ordinary skill in the art. No free water was observed upon standing, which indicates that the components of the cementing composition did not separate.

The stability data was gathered by allowing a portion of the cementing composition to cure in plastic cylinder at 80° F. for 48 hours. The cured composition was then cut into three equal sections, top, middle and bottom. The reported density of each section was determined according to procedures set forth in Section 15.6.5 of API Specification RP 10B, 22nd Edition, 1997, of the American Petroleum Institute, which is a text known and available to those of ordinary skill in the art. The stability data shows that the density of the top, middle and bottom sections was consistent, which indicates that segregation of the solids in the cementing composition (e.g., the lightweight additive) did not occur.

TABLE 3

Rheological Data at 80° F.

| | Dial Readings | | | | | 10 second | 10 minute | Plastic Viscosity | Yield Point |
|---|---|---|---|---|---|---|---|---|---|
| Time | 300 RPM | 200 RPM | 100 RPM | 6 RPM | 3 RPM | at 3 RPM | at 3 RPM | (cp) | (lb/100 ft$^2$) |
| 0 | 205 | 115 | 52 | 4 | 2 | 3 | 15 | 191 | 0 |
| 20 min | 145 | 84 | 39 | 3 | 2 | 3 | 7 | 133 | 0 |

| | Stability at 80° F. | | | Fluid Loss at 80° F. | |
|---|---|---|---|---|---|
| Free Water at 80° F. | Top (lbs/gal) | Middle (lbs/gal) | Bottom (lbs/gal) | Measured (ml/30 min) | API (ml/30 min) |
| 0 mL  0% | 8.4 | 8.4 | 8.4 | 14.5 | 29 |

The dial readings indicate the viscosity of the cementing composition. The dial readings were determined using a Fann Model 35 viscometer at the different rotational speeds as indicated between 300 and 3 RPM. The procedure used to The fluid loss data was determined according to procedures for testing at temperatures less than 194° F., with atmospheric pressure conditioning and a static fluid loss cell, as set forth in Section 10 of API Recommended Practice 10B, 22nd Edition, 1997, of the American Petroleum Institute, which is a text known and available to those of ordinary skill in the art. The fluid loss data indicates that the fluid loss of the cementing composition is low enough to enable maintenance of a consistent fluid volume within the cementing composition, and prevent formation fracture (lost circulation) or flash set (dehydration) when the cementing composition is introduced into a well bore.

Crush and permeability data regarding the cementing composition prepared according to this Example 2 is reported below in Table 4, where "n/a" indicates that the property was not measured, "psi" indicates pounds per square inch and "mD" indicates millidarci.

The crush data was determined by pouring the cementing composition into a 2-in cube, allowing it to cure in a water bath at 107° F. for 2 to 6 days, and then crushing the cured cube. This procedure is described in Section 7 of API Recommended Practice 10b, 22nd Edition, 1997, of the American Petroleum Institute, which is a text known and available to those of ordinary skill in the art.

The temperature of 550° F. at which to gather data was chosen to simulate an example of temperature conditions in a well during a steam injection operation. The crush and permeability data taken at 107° F. indicate that the cementing composition has permeability properties and can attain satisfactory strength for use in cementing in a well bore, even under high temperature conditions.

EXAMPLE 3

Rheological, gel strength, plastic viscosity, yield point, settling and free water data was determined at the temperatures reported below in Table 5 to demonstrate that the cementing composition achieves favorable properties for use in cementing a well bore at increasing temperatures. With the exception of the temperature at which the data was determined, the data reported in Table 5 was determined as described above in Table 3 of Example 2. The cementing composition used to generate the data in Table 5 had the same composition as that used to generate the data in Table 3 above, and was merely a different lot tested at a different time.

TABLE 5

| Rheological Data at 80° F. | | | | | | | | | | |
|---|---|---|---|---|---|---|---|---|---|---|
| | Dial Readings | | | | | | | YP | Settling | FW at 80° F. |
| Time | 300 rpm | 200 rpm | 100 rpm | 6 rpm | 3 rpm | 10 sec. | 10 min. | PV (cp) | (lb/100 ft²) | at 80° F. | (%) |
| 0 | 260 | 164 | 77 | 5 | 3 | 4 | 17 | 252 | 0 | 0 | 0 |
| Rheological Data at 110° F. | | | | | | | | | | |
| | Dial Readings | | | | | | | YP | Settling | FW at |
| Time | 300 rpm | 200 rpm | 100 rpm | 6 rpm | 3 rpm | 10 sec. | 10 min. | PV(cp) | (lb/100 ft²) | at 110° F. | 110° F. (%) |
| 0 | 300+ | 205 | 72 | 5 | 3 | 3 | 9 | 288 | 0 | 0 | 0 |
| Rheological Data at 140° F. | | | | | | | | | | |
| | Dial Readings | | | | | | | YP | Settling | FW at |
| Time | 300 rpm | 200 rpm | 100 rpm | 6 rpm | 3 rpm | 10 sec. | 10 min. | PV(cp) | (lb/100 ft²) | at 140° F. | 140° F. (%) |
| 0 | 300+ | 210 | 80 | 6 | 3 | 5 | 15 | 297 | 0 | 0 | 0 |

TABLE 4

| Temperature | | | | | |
|---|---|---|---|---|---|
| 107° F. | | | 550° F. | | |
| Time (day) | Perm (mD) | Compressive Strength (psi) | Time (day) | Perm (mD) | Compressive Strength (psi) |
| 2 | n/a | 114 | 12 | n/a | 455 |
| 3 | n/a | 325 | 30 | 0.00875 | 1157 |
| 4 | n/a | 284 | 60 | 0.0153 | 1052 |
| 6 | n/a | 248 | 90 | 0.0234 | 1132 |
| 21 | 0.00882 | n/a | 120 | 0.0198 | 1102 |

The temperature of 107° F. at which to gather data was chosen to simulate an example of temperature conditions in a well prior to a steam injection operation. The crush and permeability data taken at 107° F. indicate that the cementing composition has permeability properties and can attain satisfactory strength for use in cementing in a well bore.

The data reported in Table 4 illustrates that cementing compositions prepared according to methods described herein are suitable for use in cementing a well bore at increasing temperatures.

The present invention is well adapted to carry out the objects and attain the ends and advantages mentioned as well as those which are inherent therein. While numerous changes may be made by those skilled in the art, such changes are encompassed within the spirit of this invention as defined by the appended claims.

The invention claimed is:

1. A cementing composition for cementing a subterranean zone at temperatures of from about 200° F. to about 800° F., said composition comprising:
    a cement component comprising from about 30% to about 60% by weight of calcium aluminate, from about 2% to about 10% by weight of sodium polyphosphate and from about 10% to about 60% by weight of fly ash:
    water present in said cementing composition in an amount of from about 10% to about 80% by weight of said cement component;

a retarder present in said cementing composition in an amount of from about 0.1% to about 10% by weight of said cement component;

a defoamer present in said cementing composition in an amount of from about 0.1% to about 20% by weight of said cement component;

a surfactant present in said cementing composition in an amount of from about 1% to about 5% by weight of said cement component;

a latex selected from the group consisting of ethylene/vinylacetate, styrene butadiene, butadiene acrylonitrile and acetate ethylene, said latex present in said cementing composition in an amount of from about 15% to about 50% by weight of said cement component; and a lightweight additive comprised of glass spheres having a specific gravity of less than about 0.70 present in said cementing composition in an amount of from about 15% to about 50% by weight of said cement component, wherein said cementing composition has a density of less than about 10.5 pounds per gallon, and wherein when said cementing composition is set in a subterranean zone at temperatures of from about 200° F. to about 800° F., said set form of said cementing composition is resistant to alkali carbonation induced deterioration and maintains its compressive strength and competency.

2. The cementing composition of claim 1 further comprising vitrified shale.

3. The cementing composition of claim 1 wherein said fly ash is selected from the group consisting of ASTM class F fly ash and fly ash having a Blaine fineness of about 10,585 cm$^2$/g.

4. The cementing composition of claim 1 wherein said sodium polyphosphate is selected from the group consisting of sodium metaphosphate, sodium triphosphate, sodium hexametaphosphate, vitreous sodium phosphates, and mixtures thereof.

5. The cementing composition of claim 1 wherein said retarder is selected from the group consisting of citric acid, gluconic acid and tartaric acid.

6. The cementing composition of claim 1 wherein the lightweight additive has a specific gravity of about 0.32, and said cementing composition has a density of about 8.5 pounds per gallon.

7. The cementing composition of claim 1 wherein the lightweight additive has a specific gravity selected from the group consisting of about 0.60, about 0.50, about 0.40, and about 0.30, and the cementing composition has a density selected from the group consisting of about 10 pounds per gallon, about 9.5 pounds per gallon, about 9 pounds per gallon, about 8.5 pounds per gallon, about 8 pounds per gallon, and about 7.5 pounds per gallon.

8. The cementing composition of claim 1 further comprising ground rubber particles.

9. The cementing composition of claim 1 further comprising a foaming agent; and a foam stabilizer.

10. The cementing composition of claim 9 wherein said foaming agent comprises an alpha-olefinic sulfonate having the formula $$H(CH_2)_n-CH=CH-(CH_2)_m SO_3 Na$$

wherein n and m are individually integers in the range of from about 6 to about 16, and said foaming agent is present in an amount in the range of from about 0.2% to about 5% by weight of the water in the cementing composition.

11. The cementing composition of claim 9 wherein said foam stabilizer comprises a betaine having the formula $$R-CONHCH_2CH_2N^+(CH_3)_2CH_2CO_2^-$$

wherein R is a radical selected from the group of decyl, cetyl, oleyl, lauryl and cocoyl, and said foam stabilizer is present in an amount in the range of from about 0.2% to about 5% by weight of the water in the cementing composition.

* * * * *

UNITED STATES PATENT AND TRADEMARK OFFICE
CERTIFICATE OF CORRECTION

| | |
|---|---|
| PATENT NO. | : 7,390,356 B2 |
| APPLICATION NO. | : 11/078090 |
| DATED | : June 24, 2008 |
| INVENTOR(S) | : David S. Kulakofsky et al. |

It is certified that error appears in the above-identified patent and that said Letters Patent is hereby corrected as shown below:

Claim 1, Column 11, Line 5, correct "amount of from about 0.1% to about 20% by weight of" to read -- amount of from about 0.1% to about 2.0% by weight of --

Signed and Sealed this

Twenty-eighth Day of July, 2009

JOHN DOLL
*Acting Director of the United States Patent and Trademark Office*